United States Patent [19]
Wheatley

[11] Patent Number: 5,772,273
[45] Date of Patent: Jun. 30, 1998

[54] SPRING CLIP FOR RETAINING SNAP FASTENERS ON A TONNEAU COVER RAIL

[76] Inventor: Donald E. Wheatley, 1119 Wright St., Ann Arbor, Mich. 48105

[21] Appl. No.: 675,685

[22] Filed: Jul. 3, 1996

[51] Int. Cl.⁶ .................................................... B60P 7/02
[52] U.S. Cl. ...................................... 296/100; 160/368.1
[58] Field of Search .................................. 296/100, 138, 296/104, 105, 118; 160/371, 368.1, 327, 369; 248/298.1

[56] References Cited

U.S. PATENT DOCUMENTS

| 4,838,602 | 6/1989 | Nett | 296/100 |
|---|---|---|---|
| 5,207,262 | 5/1993 | Rushford | 160/354 |
| 5,261,719 | 11/1993 | Tucker | 296/100 |
| 5,310,238 | 5/1994 | Wheatley | 296/100 |
| 5,331,993 | 7/1994 | Billbury | 135/119 |
| 5,365,994 | 11/1994 | Wheatley | 160/354 |
| 5,522,635 | 6/1996 | Downey | 296/100 |

*Primary Examiner*—David M. Mitchell
*Assistant Examiner*—Jason Morrow
*Attorney, Agent, or Firm*—Harness, Dickey & Pierce, P.L.C.

[57] ABSTRACT

A tonneau cover for a pick-up truck cargo box in which a flexible sheet cover is attached to a frame with snap fasteners. The snap portions carried by the frame rails are slidable there along and can be removed from the rail to change the position of the snap fastener. A spring retainer is mounted to the rail end to prevent inadvertent removal of the snap portions by providing a deflectable stop in the path of travel of the snap portions. The stop portion is deflectable to enable the snap portions to be removed from the rail when desired.

5 Claims, 2 Drawing Sheets

SPRING CLIP FOR RETAINING SNAP FASTENERS ON A TONNEAU COVER RAIL

BACKGROUND AND SUMMARY OF THE INVENTION

The present invention relates to tonneau covers for covering a pick-up truck cargo box and in particular to a spring clip for retaining sliding snap fasteners on the rail of a tonneau cover frame.

Soft tonneau covers for pick-up trucks typically have two major components. The first component is a flexible sheet cover such as a vinyl coated fabric. The second component is a rectangular frame attached to the pick-up truck cargo box. The frame and cover include a fastening mechanism for attaching the cover to the frame, thus covering the cargo box. One commonly employed means for fastening the cover to the frame is the use of a plurality of snap fasteners about the periphery of the cover. One portion of each snap fastener is attached to the flexible sheet while the other portion of each fastener is carried by the tonneau frame.

Preferably, the snap fasteners are slidable along the length of the frame rails. This enables the snaps to be positioned anywhere along the length of the rail to accommodate variations in the snap location on the cover. This prevents wrinkling or excessive pulling in the cover that would occur if the snaps were fixed in location on the rail. The snaps are slidable along the rails and are retained on the rails by the corner blocks at each corner of the frame used to attach the individual frame rails to one another at the rail ends.

The snap portions mounted to the rails include a generally C-shaped base that slides along a snap mounting wall of the rail. The snap fastener is not centered on the base, enabling the snap fastener to be located in one of two locations relative to the rail. In one position, a greater amount of tension is applied to the flexible sheet cover when it is attached. This enables the tension in the flexible sheet to be varied with seasonal temperature changes that affect the size of the flexible sheet.

The two locations of the snap fastener are changed by sliding the snap portions off one end of a rail, turning them 180° relative to this original position and sliding them back onto the rail. This necessitates the ability to remove the fasteners from the rail.

When large objects are being carried in the cargo box which extend above the cargo box walls, it is necessary to remove the tonneau cover from the cargo box. This is accomplished by rolling the cover forward and tying it at the front end of the cargo box. When the pick-up box tailgate is lowered to load the object into the cargo box, the rear tonneau cover frame rail, however, remains in place, spanning between the two side walls of the cargo box at the rear end. To load and carry a large object, it is necessary to remove the rear rail of the tonneau frame. This is accomplished by detaching the rear frame rail from the two side rails. When this is done, however, the rear corner blocks have been removed and the snap portions mounted to the side rails are free to slide off the end of the side rails. To avoid losing the snap portions when driving, it is necessary to either secure the snap portions to the rail or first remove the snap portions and keep them in a safe place.

One approach to maintaining the snap portions on the rail is to use a flexible steel for the base of the snap portions so that one snap portion can be formed to a C-shape which firmly grips the rail does not easily slide off unless intended. However, to provide a low cost snap fastener, it is preferred to form the snap portion as a single-piece die cast part. This is less expensive and stronger than an assembled snap portion having a male snap member riveted to a C-shaped steel base. However, the die cast base does not have the ability to be crimped or shaped to firmly grip the rail.

Accordingly, it is an object of the present invention to provide a means for retaining the snap portions onto the tonneau rail while providing the ability to remove the snap fasteners, when desired, to change the location of the snap fastener.

The present invention provides a spring retainer mounted to the ends of the side rails that has a stop portion extending into the path of travel of the snap portions on the rail. The stop portion blocks sliding movement of the snap portions beyond the spring retainer to prevent the snap portions from moving off the end of the rail. The stop portion of the spring retainer is deflectable out of the path of travel by application of a predetermined force on the stop portion so that the snap portions can be removed from the rail when desired for changing the location of the snap fastener.

The snap portions slide along a snap mounting wall of the rails which has a pair of overhanging flanges on both sides for attachment of the C-shaped base to the rail. The spring retainer of the present invention is mounted to the rail beneath the snap mounting wall. The stop portion of the spring retainer extends through an opening in the snap mounting wall and into the path of the snap portions.

Further objects, features and advantages of the invention will become apparent from a consideration of the following description and the appended claims when taken in connection with the accompanying drawings.

DETAILED DESCRIPTION OF THE PREFERRED EMBODIMENT

Figure 1:
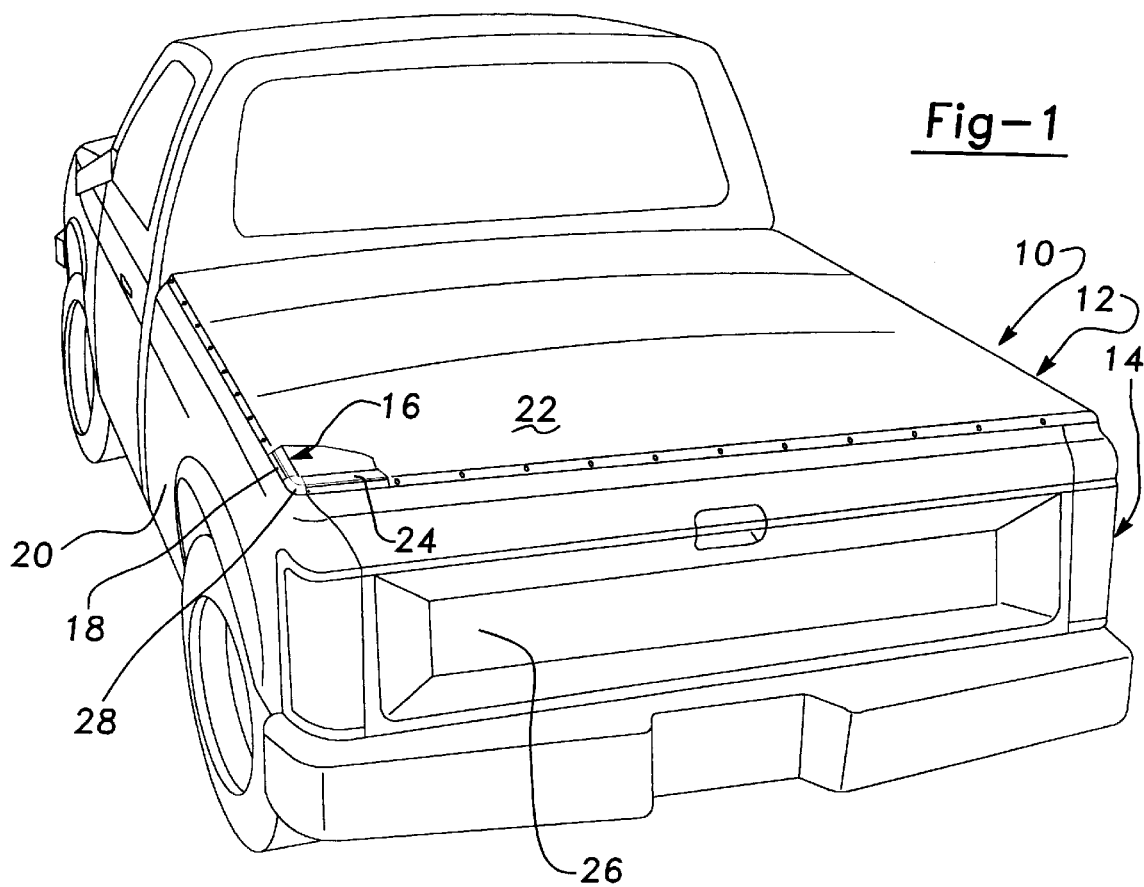
FIG. 1 is a perspective view of a pick-up truck having a tonneau cover having snap fasteners and employing the spring retainer of the present invention.

With reference to FIG. 1, a pick-up truck 10 is shown having a tonneau cover 12 mounted upon the cargo box 14. The tonneau cover 12 includes a tonneau frame 16, only a portion of which is shown at the left rear corner of the cargo box. The frame 16 includes a frame side rail 18 mounted upon the top of the cargo box side wall 20 and a rear rail 24 above the tailgate 26. A flexible sheet cover 22 is attached to the frame 16 and covers the cargo box.

The frame 16 is generally rectangular having four rails attached end-to-end forming the rectangular frame placed upon the top of the cargo box. The rear rail 24 is attached to the side rail 18 by a corner block 28. The corner block 28 has legs (not shown) which extend into an interior channel 30 (FIG. 3) of the side and rear rails and are held in place by a threaded fastener.

Figure 2:
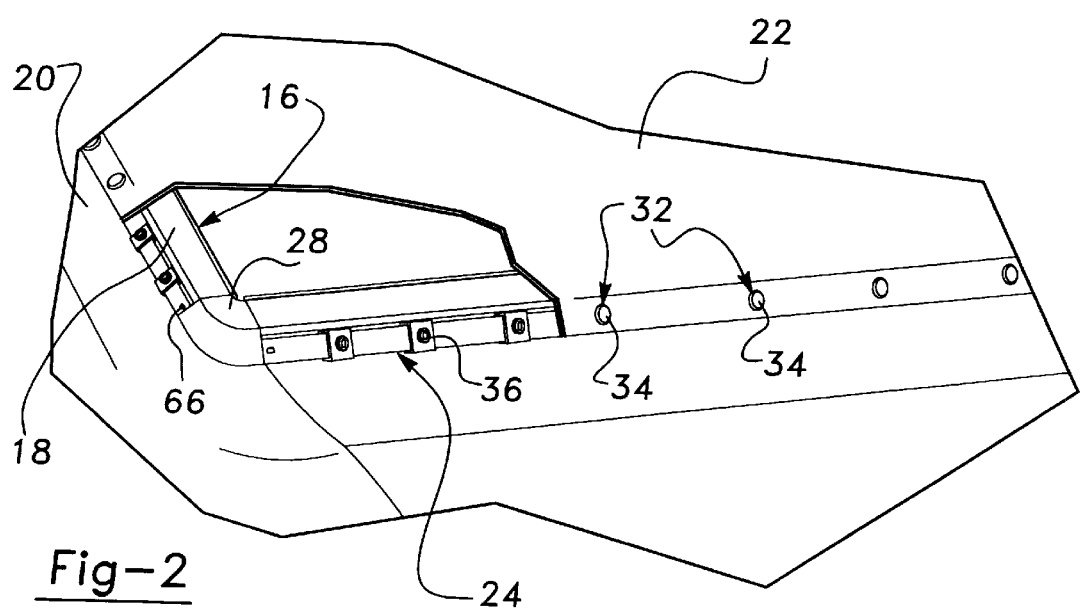
FIG. 2 is an enlarged perspective view of the left rear corner of the cargo box shown in FIG. 1 illustrating the corner of the tonneau frame.

With reference to FIG. 2, it can be seen that the cover 22 is attached to the frame by snap fasteners 32. The snap fasteners have a female member 34 attached to the cover 22 about its periphery and a male member 36 slidably carried on the frame rails. The male members 36 are each mounted to a C-shaped base 38. Each male member 36 and its corresponding base 38 forms a snap portion 39.

Figure 3:
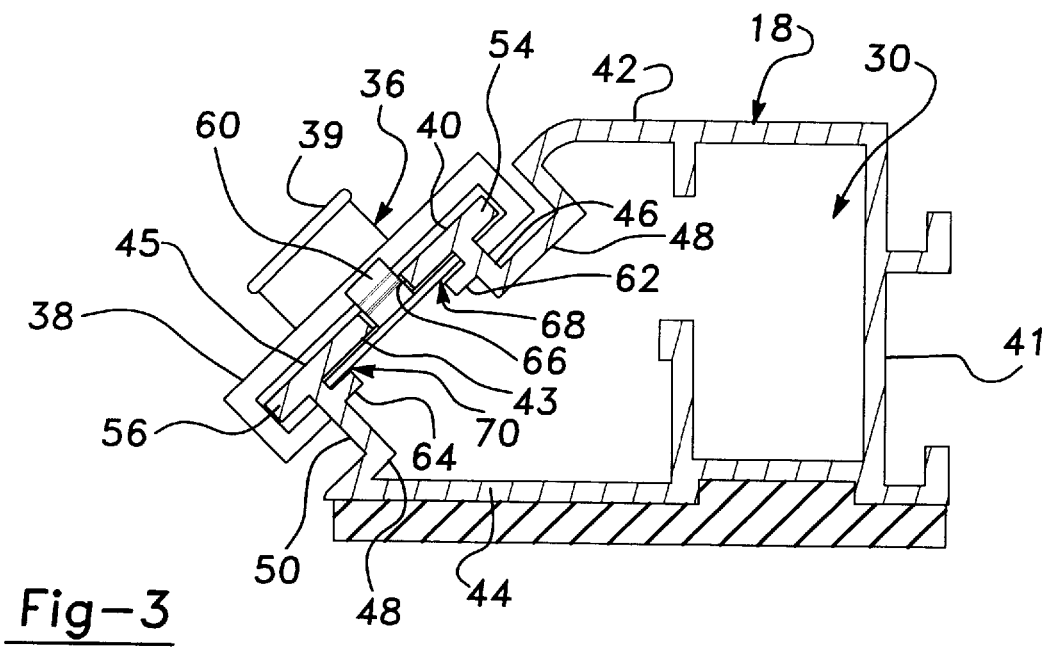
FIG. 3 is a sectional view of the end of the side rail illustrating the spring retainer of the present invention.

The shape of the frame rails is best shown in FIG. 3 with the rail 18. The rail 18 has a closed section shape with an inner wall 41, an upper wall 42 and a lower wall 44. An outer wall 48 slopes downwardly and outwardly from the upper wall 42 to the lower wall 44. The outer wall 48 is interrupted by the snap mounting wall 40. The snap mounting wall 40 is coupled to the outer wall 48 by an upper connecting wall 46 and a lower connecting wall 50. The connecting walls 46, 50 project from an inner surface 43 of the snap mounting wall 40.

The snap mounting wall has side edges 54, 56 that extend beyond the connecting walls 46, 50 forming over hanging flanges. It is about the overhanging flanges that the C-shaped bases 38 of the snap portions 39 are retained on the rail.

Figure 4:
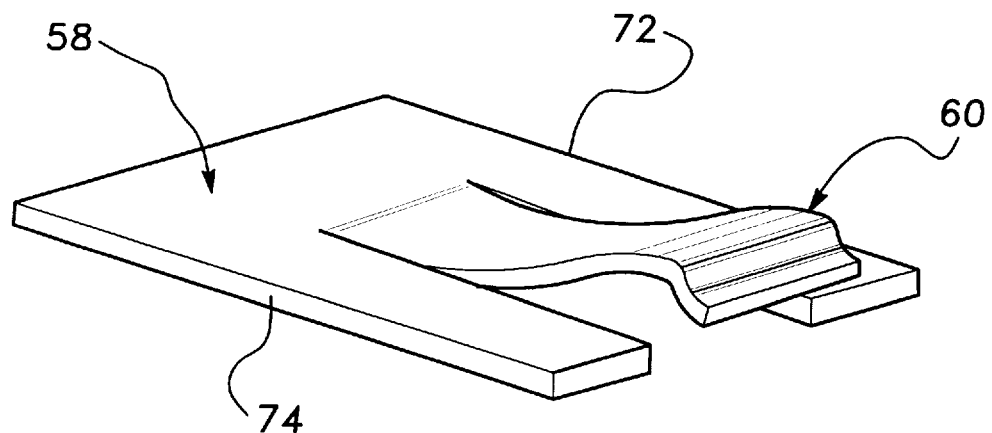
FIG. 4 is a perspective view of the spring retainer of the present invention.

To prevent inadvertent removal of the snap portions 39 from the rail, a spring retainer 58 is provided at the end of the rail. The retainer 58, as shown in FIG. 4, is a flat, substantially planar strip of resilient material, such as spring steel. The strip has a finger 60 bent so as to extend out of the plane of the material. The spring retainer 58 is seated beneath the snap mounting wall 40 adjacent the inner surface of the wall 40.

Flanges 62, 64 extending toward one another from the connecting walls 46, 50, respectively, to form receiving channels 68, 70, respectively. The receiving channels 68, 70 receive the side edges 72, 74 of the spring retainer 58 to hold the spring retainer in place.

A slot 66 is formed in the snap mounting wall 40 at the end of the rail. The finger 60 of the spring retainer extends through the slot 66 and beyond the outer surface 45 of the wall 40. The finger 60 extends beyond the wall 40 and into the path of travel of the snap portions 39 forming a stop to prevent movement of the snap portions beyond the spring retainer. When a sufficiently high force is applied to a snap portion 39, the base 38 will deflect the finger 60 downward, enabling the snap portion to slide over the spring retainer and be removed from the rail when desired. To return the fastener base to the rail, sufficient force is applied to the snap portion to again deflect the finger 60 from the path of travel of the snap portion.

The primary application of the spring retainer is at the rear end of the two side rails. However, the spring retainers can be used at the ends of all of the rails if desired.

The spring retainer 58 can be inexpensively manufactured from a small piece of spring steel. The flanges 62, 64 can be formed in the extrusion die for the rails at a relatively low cost. The spring retainer thus enables a low cost die cast snap portion 39 to be used in place of a more expensive assembled snap portion that can be shaped to hold it in place on the rail.

It is to be understood that the invention is not limited to the exact construction illustrated and described above, but that various changes and modifications may be made without departing from the spirit and scope of the invention as defined in the following claims.

I claim:

1. A tonneau cover for covering a cargo box of a pick-up truck, the cargo box having spaced side walls, a front wall and a tailgate, each of which has a top surface, said tonneau cover comprising:

a generally rectangular frame having a plurality of elongated rails each having two ends, said rails being joined to one another at said ends thereof to form said rectangular frame, said frame being disposed upon the top of said cargo box;

a cover of a flexible sheet material for covering the cargo box;

snap fastener means for attaching said cover to said frame, said snap fastener means including a plurality of snap fasteners, each said snap fastener having a first snap portion fixed to said cover and a second snap portion carried by one of said rails and being slidable longitudinally along the length of said one rail along a path of travel; and a spring retainer mounted to said one rail adjacent one end thereof having a stop portion thereof disposed in said path of travel of said second snap portions mounted on said one rail to block the sliding movement of said second snap second portions beyond said one end of said one rail, said stop portion of said spring retainer being deflectable out of said path of travel by application of a predetermined force on said stop portion whereby said second snap portions can be selectively removed from said one rail.

2. The tonneau cover of claim 1 wherein said spring retainer is a flat substantially planar strip of material having a portion bent out of the plane of said planar strip and into said path of travel of said second snap portion to form said stop portion of said spring retainer.

3. The tonneau cover of claim 1 wherein:

said one rail has an elongated snap mounting wall extending the length of said rail for mounting said second snap portions to said one rail, said snap mounting wall having an outer surface over which said second snap portions slide and an opposite inner surface;

said one rail further having means for mounting said spring retainer to said rail adjacent said inner surface of said snap mounting wall and adjacent said one end of said one rail; and said snap mounting wall having an opening therein adjacent said one end of said one rail through which said stop portion of said spring retainer extends into said path of travel of said second snap portions.

4. The tonneau cover of claim 3 wherein:

said one rail includes a pair of connecting walls attached to said snap mounting wall and projecting at right angles from said inner surface thereof, said connecting walls being parallel to and spaced from one another and extending the length of said snap mounting wall;

said means for mounting said spring retainer including a mounting flange extending from each of said connecting walls toward one another forming a receiving channel between each mounting flange and said snap mounting wall;

said spring retainer comprising a flat, substantially planar, strip of material having opposite side edges disposed in said receiving channels to mount said spring retainer to said rail, a portion of said spring retainer being bent out of the plane of said planar strip, through said opening in said snap mounting wall and into said path of travel to form said stop portion of said spring retainer.

5. The tonneau cover of claim 4 wherein said snap mounting wall has opposite side edges which extend beyond said connecting walls forming overhanging flanges and wherein said second snap portions each including a C-shaped base which is fitted over said snap mounting wall and around said overhanging flanges to mount said second snap portions to said one rail.

* * * * *